US009802698B2

(12) United States Patent
Capelle et al.

(10) Patent No.: US 9,802,698 B2
(45) Date of Patent: Oct. 31, 2017

(54) ROTOR HUB FOR ROTARY WING AIRCRAFT

(71) Applicant: Sikorsky Aircraft Corporation, Stratford, CT (US)

(72) Inventors: Steven M. Capelle, Derby, CT (US); Kwok Chin, Stamford, CT (US); Kevin A. White, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 203 days.

(21) Appl. No.: 14/880,921

(22) Filed: Oct. 12, 2015

(65) Prior Publication Data

US 2016/0167767 A1    Jun. 16, 2016

Related U.S. Application Data

(60) Provisional application No. 62/091,110, filed on Dec. 12, 2014.

(51) Int. Cl.
*B64C 27/32* (2006.01)
*B64C 27/35* (2006.01)

(52) U.S. Cl.
CPC .............. *B64C 27/35* (2013.01); *B64C 27/32* (2013.01)

(58) Field of Classification Search
CPC .......... B64C 11/02; B64C 11/04; B64C 11/06; B64C 27/00; B64C 27/04; B64C 27/06; B64C 27/32; B64C 27/35
See application file for complete search history.

(56) References Cited

U.S. PATENT DOCUMENTS 3,761,199 A * 9/1973 Ferris ...................... B64C 27/32
                                                        416/134 R

* cited by examiner

*Primary Examiner* — Richard Edgar
(74) *Attorney, Agent, or Firm* — Cantor Colburn LLP

(57) ABSTRACT

A rotor hub configured to support and rotate a plurality of rotor blades about an axis of rotation is includes a cylindrical body having a central shaft hole including the axis of rotation. The shaft hole has a radius extending from the axis of rotation radially. A plurality of radial spokes extends from the cylindrical body in a spoke direction. A plurality of arcuate segments extends between the distal ends of adjacent spokes to define a plurality of hub apertures. The spoke direction extends at an angle to the radial direction in both the horizontal plane, and a vertical plane, perpendicular to the horizontal plane. A line defined by the spoke direction does not intersect the axis of rotation. The spoke direction extends at an angle in the horizontal plane in a direction opposite to a direction of rotation of the rotor hub about the axis of rotation.

15 Claims, 6 Drawing Sheets

ROTOR HUB FOR ROTARY WING AIRCRAFT

CROSS-REFERENCE TO RELATED APPLICATIONS

This application claims the benefit of U.S. provisional patent application Ser. No. 62/091,110 filed Dec. 12, 2014, the entire contents of which are incorporated herein by reference.

STATEMENT REGARDING FEDERALLY SPONSORED RESEARCH OR DEVELOPMENT

This invention was made with Government support under Contract No. N00019-06-C-0081 with the Department of the Navy. The Government has certain rights in the invention.

BACKGROUND OF THE INVENTION

This invention relates to rotor blade mounting assemblies and, more particularly, to a rotor hub of a rotor blade mounting assembly for use on a rotary wing aircraft.

A rotor hub is the primary structural component of a rotor mount assembly having a plurality of rotor blades. The rotor hub is configured to drive torque to each rotor blade and balance the centrifugal loads between opposing rotor blades. When the mounting assembly is used to form a main rotor system of a rotary wing aircraft, the rotor hub and its associated parts are commonly made of high strength, lightweight, critical metals or alloys, such as titanium or aluminum. Although these metal components perform adequately, there is a continuing desire to reduce the material and therefore the weight of the aircraft, including the rotor hub.

BRIEF DESCRIPTION OF THE INVENTION

According to one embodiment of the invention, a rotor hub configured to support and rotate a plurality of rotor blades about an axis of rotation is provided including a cylindrical body having a central shaft hole including the axis of rotation. The shaft hole has a radius extending from the axis of rotation in a radial direction. A plurality of radial spokes extends from the cylindrical body in a spoke direction. A plurality of arcuate segments extends between the distal ends of adjacent spokes to define a plurality of hub apertures. The spoke direction extends at an angle to the radial direction in both the horizontal plane, and a vertical plane perpendicular to the horizontal plane. A line defined by the spoke direction does not intersect the axis of rotation. The spoke direction extends at an angle in the horizontal plan in a direction opposite to a direction of rotation of the rotor hub about the axis of rotation.

In addition to one or more of the features described above, or as an alternative, in further embodiments the spoke direction of the at least one spoke extends at angle to the central shaft hole in the vertical plane parallel to a first steady blade vector.

In addition to one or more of the features described above, or as an alternative, in further embodiments the first steady blade vector is a sum of a steady centrifugal force and a steady thrust force acting on the rotor hub.

In addition to one or more of the features described above, or as an alternative, in further embodiments an angle between adjacent spokes within the horizontal plane is bisected by a second steady blade vector.

In addition to one or more of the features described above, or as an alternative, in further embodiments the second steady blade vector is a sum of the steady centrifugal force and a shaft torsion force acting on the rotor hub.

In addition to one or more of the features described above, or as an alternative, in further embodiments each of the at least one spokes is arranged at a substantially identical angle relative to the shaft hole.

In addition to one or more of the features described above, or as an alternative, in further embodiments each of the at least one spokes is arranged at a different angle relative to the shaft hole.

In addition to one or more of the features described above, or as an alternative, in further embodiments a thickness of at least one of the plurality of spokes varies from adjacent the shaft hole to the distal end.

In addition to one or more of the features described above, or as an alternative, in further embodiments an indentation is formed in a first surface of at least one of the plurality of spokes.

In addition to one or more of the features described above, or as an alternative, in further embodiments a yoke assembly is received within at least one of the hub apertures. The yoke assembly is configured to couple one of the plurality of rotor blades to the body.

In addition to one or more of the features described above, or as an alternative, in further embodiments a rotary wing aircraft comprising the rotor hub additionally includes an airframe, the rotor blades connected to the rotor hub, and an engine disposed in the airframe which rotates the rotor hub and rotor blades to generate lift.

According to another embodiment of the invention, a rotor hub configured to support and rotate a plurality of rotor blades about an axis of rotation which rotates in a horizontal plane is provided including a cylindrical body having a central shaft hole connecting an upper surface of the body and a lower surface of the body. The central shaft hole has a radius extending from the axis in a radial direction and a plurality of splines formed on an interior surface thereof. Seven radial spokes extend from the cylindrical body adjacent the central shaft hole in a substantially identical spoke direction. The seven radial spokes are equidistantly spaced about a periphery of the central shaft hole. Each radial spoke extends at a first angle in a vertical plane of the rotor hub such that a line defined by the radial spoke does not intersect the axis of rotation. Each radial spoke also extends at a second angle in a horizontal plane, perpendicular to the vertical plane of the rotor hub, the second angle being arranged in a direction opposite the direction of rotation of the rotor hub about the axis of rotation. Seven substantially identical arcuate segments are mounted to a distal end of two adjacent radial spokes to define a hub aperture there between. The hub apertures include an opening into which a corresponding yoke is insertable to connect the hub to the blade. Each arcuate segment is generally curved such that a radius of the rotor hub is non-uniform about a circumference thereof.

In addition to one or more of the features described above, or as an alternative, in further embodiments a thickness of each of the seven radial spokes is non-uniform over a length of the radial spoke.

In addition to one or more of the features described above, or as an alternative, in further embodiments the rotor hub is part of a rotor blade assembly. The rotor blade assembly includes a plurality of rotor blades and yokes configured to connect the rotor blades to the rotor hub.

In addition to one or more of the features described above, or as an alternative, in further embodiments the rotor blade assembly is part of a rotary wing aircraft. The rotary wing aircraft further includes an airframe and an engine disposed in the airframe which rotates the rotor blade assembly to generate lift.

Technical effects include a rotor hub optimized to reduce weight based on loading of the rotor blades.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
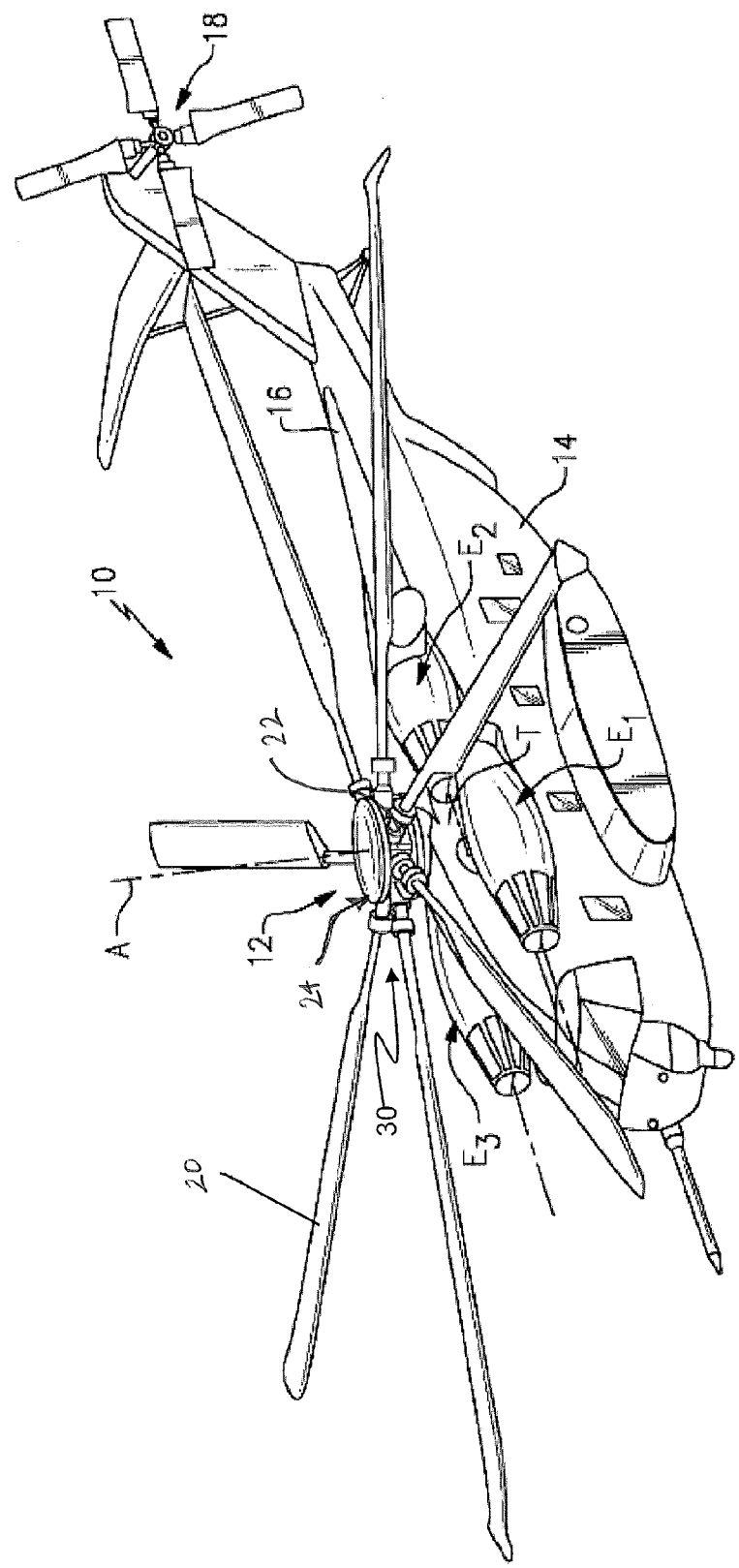
FIG. 1 is a perspective view of a rotary wing aircraft for use with the present invention.

FIG. 1 schematically illustrates a rotary-wing aircraft 10 having a main rotor system 12. The aircraft 10 includes an airframe 14 having an extending tail 16 which mounts a tail rotor system 18 as an anti-torque system. The main rotor system 12 includes a plurality of rotor blades 20 mounted to a rotor shaft 22 via a mounting assembly 24 and is driven about an axis of rotation A through a main gearbox (illustrated schematically at T) by one or more engines E. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

Figure 2:
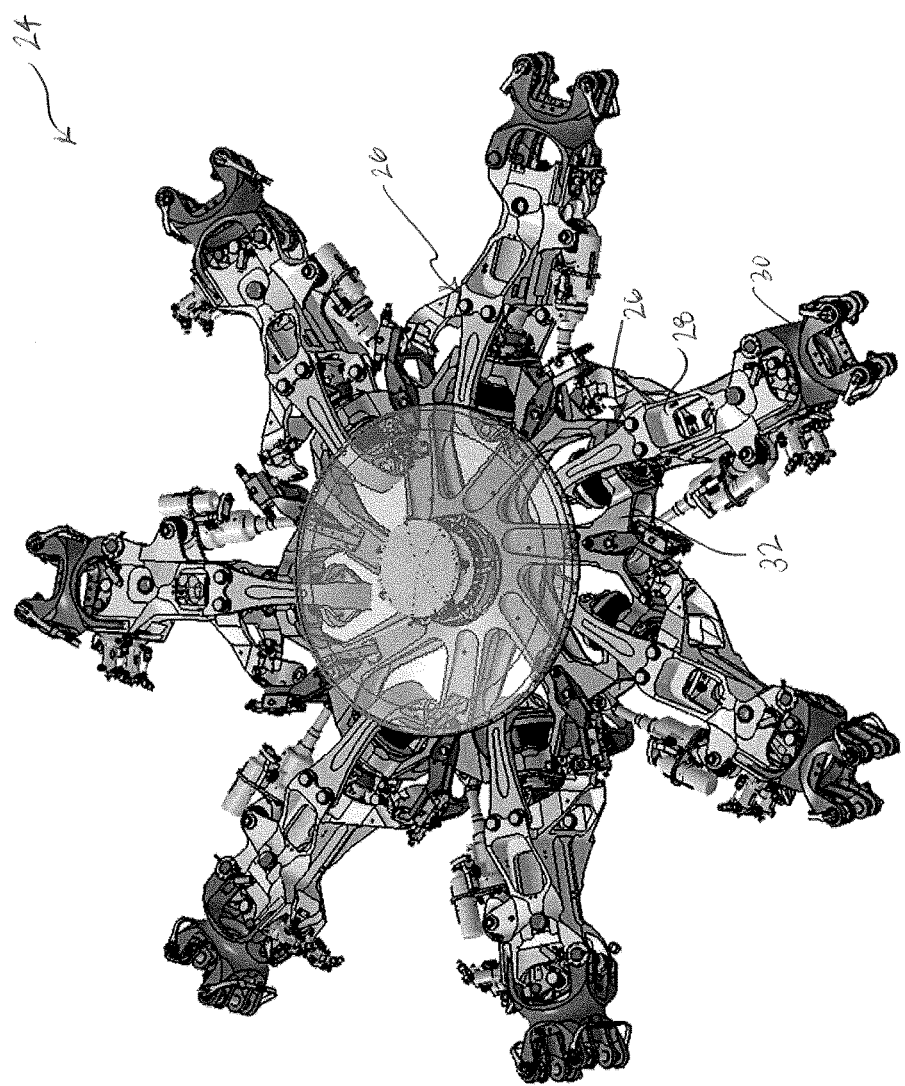
FIG. 2 is a perspective view of a plurality of a mounting assembly of the main rotor system according to an embodiment of the invention.
Figure 3:
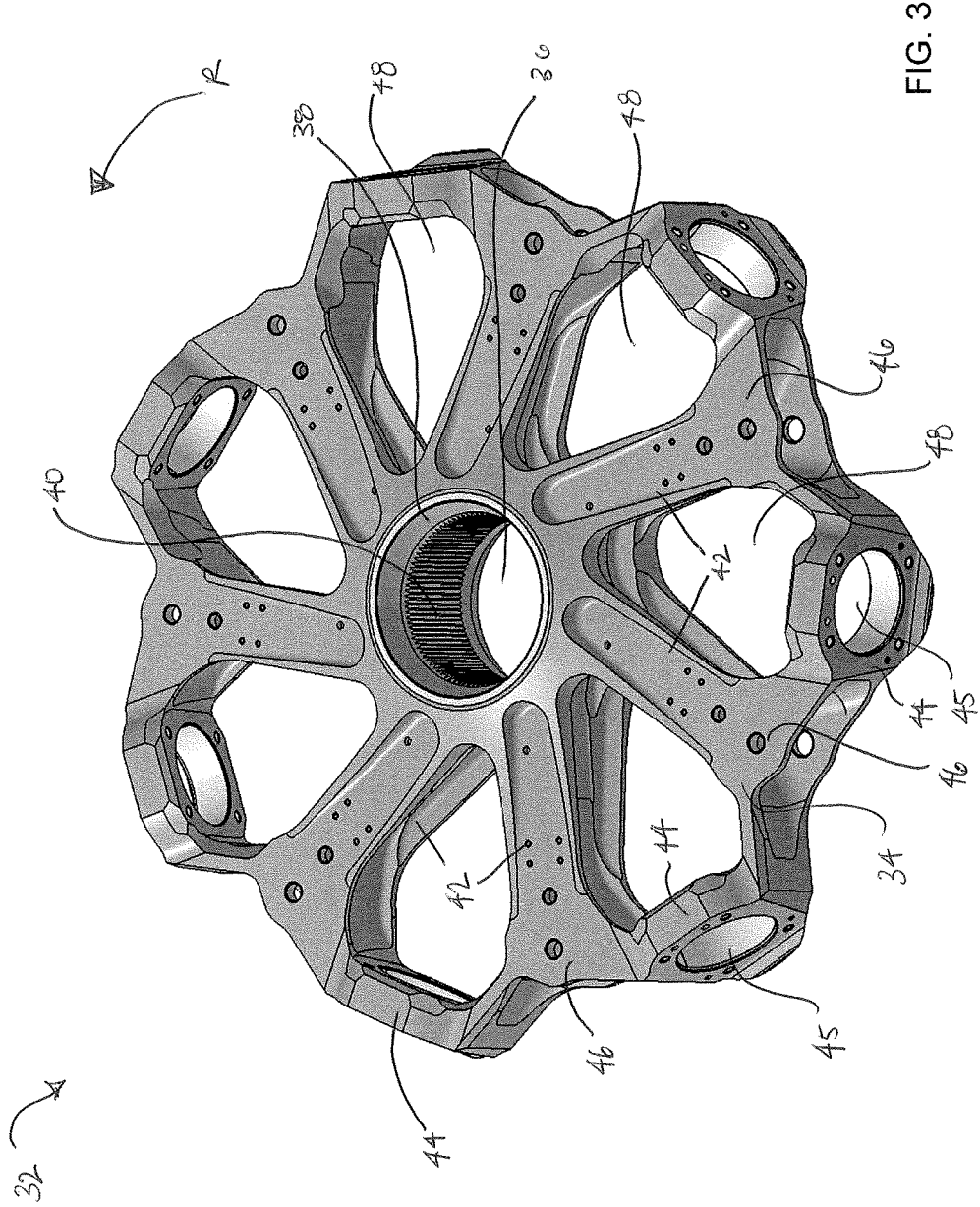
FIG. 3 is a perspective view of a rotor hub according to an embodiment of the invention.

Referring now to FIGS. 2 and 3, the mounting assembly 24 of the main rotor system 12 is illustrated in more detail. The mounting assembly 24 includes a rotor hub 32 and a plurality of yoke assemblies 26 configured to connect each rotor blade 20 to the rotor shaft 22. Each yoke assembly 26 is structurally interconnected to a corresponding rotor blade 20 by a mounting sleeve 28 joined to a blade attachment hinge/cuff 30. While shown for use with seven blades 20, it is understood that aspects of the invention can be used with other numbers of blades 20.

The rotor hub 32, as shown in FIG. 3, includes a generally cylindrical body 34 having a diameter substantially greater than its thickness. The rotor hub 32 may be formed from any structurally suitable material, including but not limited to titanium, aluminum, steel, or a composite for example.

Arranged at the center of the rotor hub 32 is a shaft hole 36 configured to receive the rotor shaft 22 of the main rotor system 12. In one embodiment, a plurality of splines 40 is formed in the inner surface 38 of the shaft hole 36 and is configured to engage a complementary plurality of splines (not shown) formed on the surface of the rotor shaft 22.

The body 34 of the rotor hub 32 includes a plurality of spokes 42 extending outwardly from adjacent the shaft hole 36 in a spoke direction. A plurality of arcuate segments 44 structurally interconnects the ends 46 of adjacent spokes 42 to form an outer periphery of the body 34. As shown, each of the arcuate segments 44 includes a bearing bore 45 configured to receive a bearing of the yoke assembly 26. Together the radial spokes 42 and the arcuate segments 44 define a plurality of hub apertures 48 configured to accept a portion of the rotor yoke assemblies 26. Though each of the illustrated plurality of hub apertures 48 has a substantially identical size and shape, hub apertures 48 of various sizes and shapes are within the scope of the invention. In the illustrated, non-limiting embodiment, each hub aperture 48 has a generally rounded, triangular shape, with the base of the triangles being positioned near the arcuate segments 44, The spokes 42 of the body 34 provide the necessary strength and rigidity to the rotor hub 32 to withstand the loading of the rotor blades 20 during flight. The thickness of each spoke 42 may remain generally constant over its length, or alternatively, may gradually decrease. In the illustrated, non-limiting embodiment, a contoured indentation is formed in a first surface 50 of one or more spokes 42 to remove additional material and weight from the rotor hub 32.

Figure 4:
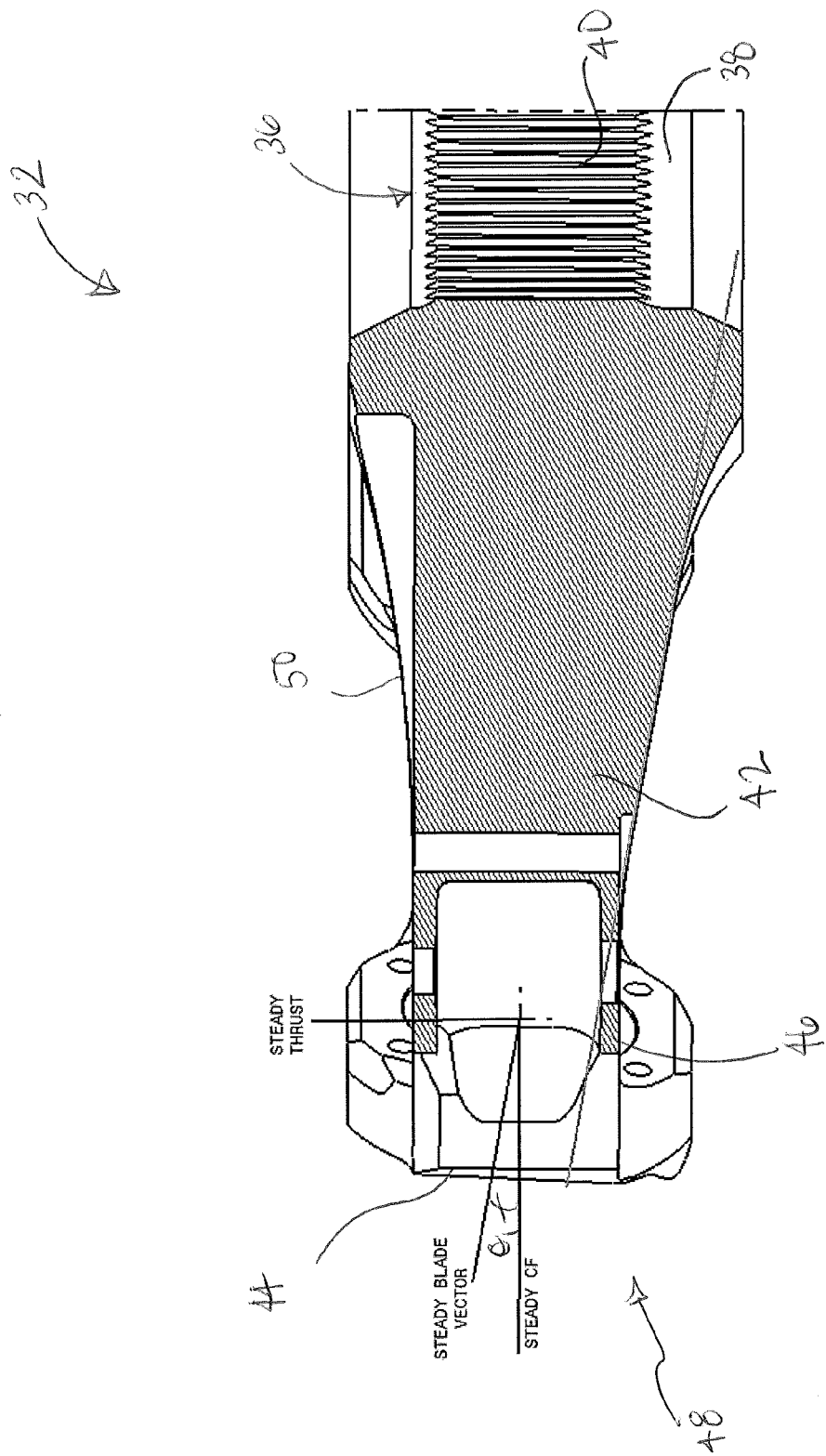
FIG. 4 is a vertical cross-sectional view of the rotor hub according to an embodiment of the invention.
Figure 5:
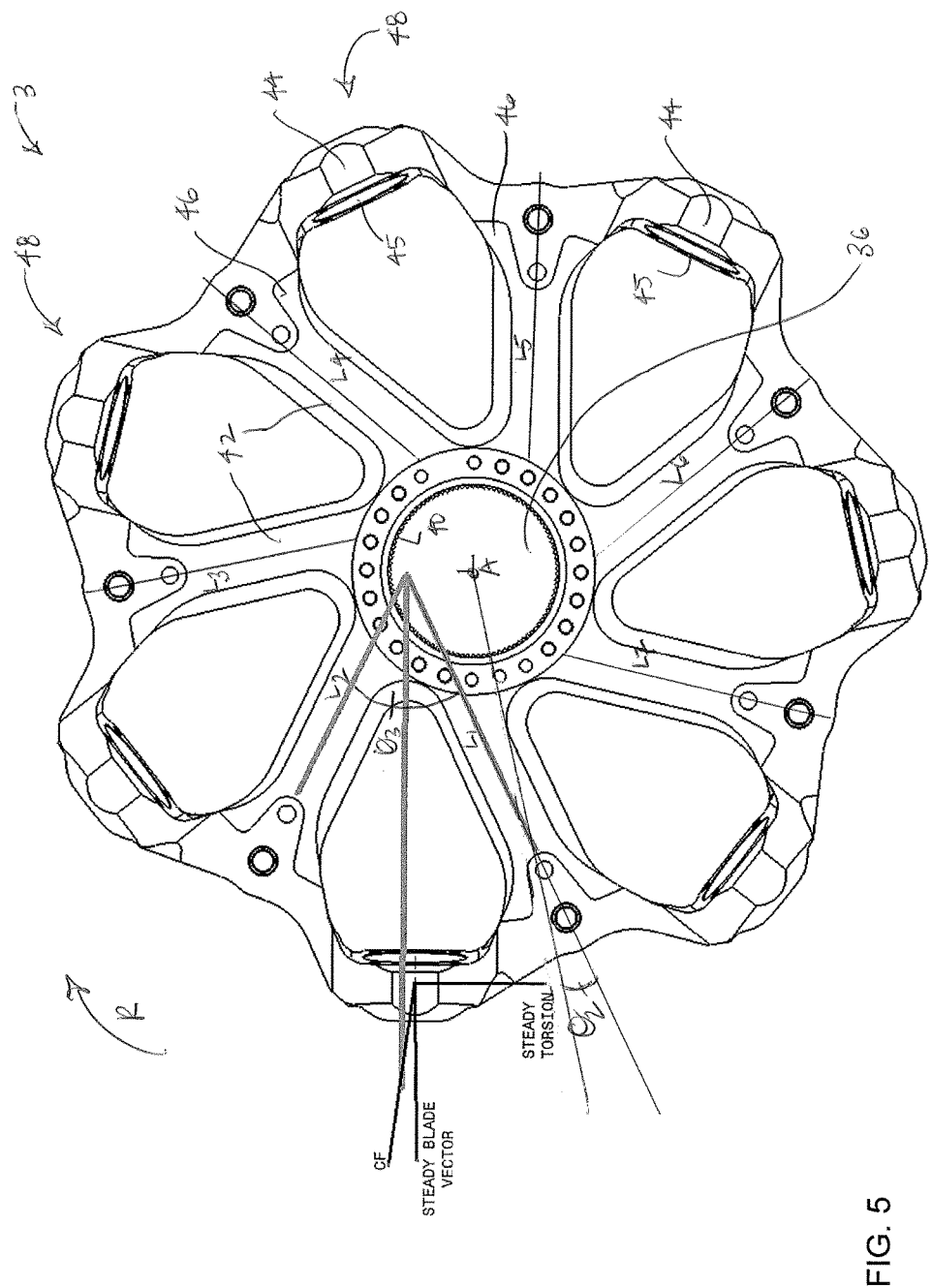
FIG. 5 is a bottom view of the rotor hub according to an embodiment of the invention.

The spoke direction of the plurality of spokes 42 is arranged at an first angle $\theta_1$ to the central shaft hole 36 in a vertical plane, as shown in FIG. 4, and at a second angle $\theta_2$ to the central shaft hole 36 in a horizontal plane, as shown in FIG. 5. The plurality of spokes 42 may be arranged at a substantially similar orientation relative to the shaft hole 36, or alternatively, at different angles.

The orientation of the spokes 42 is determined based on the intended loading of each spoke. In one embodiment, as shown in FIG. 4, the illustrated spoke 42 extends at an angle $\theta_1$ within a vertical plane of the rotor hub 32. The spoke direction within the vertical plane is parallel to a steady blade vector, the orientation of which is determined by adding a steady centrifugal force and a steady thrust force acting on the rotor hub 32. Each of the plurality of spokes 42 additionally extends within a horizontal plane at an angle $\theta_2$ relative to the radial direction extending from the axis A of the hole 36, as shown in FIG. 5. The angle $\theta_2$ is arranged in a direction opposite to the rotational direction R. A steady blade vector, arranged within a horizontal plane and indicative of the sum of a centrifugal force (not shown) and a shaft torsion force acting on the rotor hub 32, is configured to evenly divide the angle $\theta_3$ formed between adjacent spokes 42.

In one embodiment, each of the spokes 42 is canted or angled in a direction substantially opposite to the direction of rotation of rotor hub 22 about axis A, as illustrated by arrow R, such that the canted spokes 42 are angled opposite to the rotational direction R. Specifically, the spoke direction is at the angle $\theta_2$ to a radial direction extending from the axis of rotation A, where the direction of the angle is opposite to the direction of the rotation R. As a result of the orientation of the spokes 42, the plurality of lines L1-L7 defined by each spoke 42 intersect one another at a location offset from the axis of rotation A arranged at the center of the rotor hub 32 (see FIG. 4).

Figure 6:
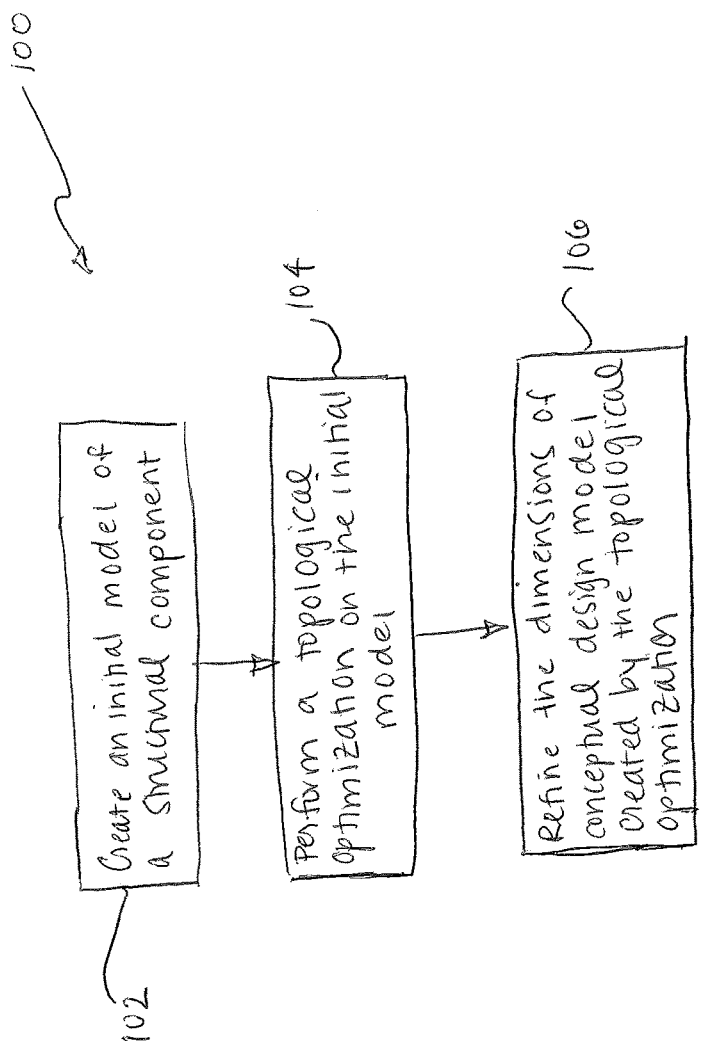
FIG. 6 is a method of optimizing the design of a rotor hub according to an embodiment of the invention.

A method 100 of optimizing the design of a structural component, such as the rotor hub 32 for example, is illustrated in FIG. 6. In block 102, an initial model of the body 34 of the rotor hub 32 is created. The initial model may have the maximum allowable dimensions based on the allowable space of a desired application. In some embodiments, the initial model may be based an existing design of a component that is intended to be optimized. In block 104, a topological optimization is performed on the initial model by subjecting the model to a plurality of load cases and corresponding boundary conditions through a computer assisted finite element method of analysis. The load cases applied to the initial model may be selected from a group of pre-defined conditions or may be individually entered by a user. The topological optimization results in a conceptual design model having an optimized geometric shape. For example, when a topological optimization was performed for the rotor hub, the boundary conditions for the load on the arcuate segments 44 (including centrifugal forces, the hub moment, thrust, and torsion, and the fixed load at the shaft hole). The resultant conceptual design model included a body 34 having a plurality of canted spokes 42. In block 106, the dimensions of the conceptual design model are then fine-tuned based on the performance and manufacturability requirements of the part. In one embodiment, this refinement of the conceptual design proposal is performed in part using additional solid modeling analysis, such as through a computer assisted finite element analysis so as to further optimize the internal stresses. Once the design is completed, the optimized hub 32 is created.

By designing a structural component, such as the rotor hub 32 using topological optimization, an optimal geometry of the component may be determined for an intended application. By optimizing the geometry of the rotor hub 32 to include at least one canted spoke 42, the strength of the hub 32 is maximized while reducing weight and material.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while shown in the context of a conventional single rotor design, it is understood that aspects could be used in coaxial aircraft designs. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor hub configured to support and rotate a plurality of rotor blades about an axis of rotation which rotates in a horizontal plane, the rotor hub comprising:
a cylindrical body having a central shaft hole including the axis of rotation, the hole having a radius extending from the axis in a radial direction;
a plurality of radial spokes, each radial spoke extending from the cylindrical body in a spoke direction; and
a plurality of arcuate segments, the arcuate segments extending between a distal end of adjacent spokes to define a plurality of hub apertures,
wherein the spoke direction extends at an angle to the radial direction in both the horizontal plane and a vertical plane perpendicular to the horizontal plane such that a line defined by the spoke direction does not intersect the axis of rotation; and the spoke direction extends at an angle in the horizontal plane in a direction opposite to a direction of rotation of the rotor hub about the axis of rotation.

2. The rotor hub according to claim 1, wherein the spoke direction of the at least one spoke extends at angle to the central shaft hole in the vertical plane parallel to a first steady blade vector.

3. The rotor hub according to claim 2, wherein the first steady blade vector is a sum of a steady centrifugal force and a steady thrust force acting on the rotor hub.

4. The rotor hub according to claim 1, wherein an angle between adjacent spokes within the horizontal plane is bisected by a second steady blade vector.

5. The rotor hub according to claim 4, wherein the second steady blade vector is a sum of the steady centrifugal force and a shaft torsion force acting on the rotor hub.

6. The rotor hub according to claim 1, wherein the spoke direction of each of the plurality of spokes is substantially identical relative to the shaft hole.

7. The rotor hub according to claim 1, wherein each of the plurality of spokes is arranged at a different angle relative to the shaft hole.

8. The rotor hub according to claim 1, wherein a thickness of at least one of the plurality of spokes varies from adjacent the shaft hole to the distal end.

9. The rotor hub according to claim 1, further comprising a yoke assembly received within at least one of the hub apertures, the yoke assembly being configured to couple one of the plurality of rotor blades to the body.

10. A rotary wing aircraft comprising the rotor hub according to any of the preceding claims, and further comprising an airframe, the rotor blades connected to the rotor hub, and an engine disposed in the airframe which rotates the rotor hub and rotor blades to generate lift.

11. A rotor hub configured to support and rotate a plurality of rotor blades about an axis of rotation which rotates in a horizontal plane, the rotor hub comprising:
a cylindrical body having a central shaft hole connecting an upper surface of the body and a lower surface of the body, the central shaft hole having a radius extending from the axis in a radial direction and a plurality of splines formed on an interior surface thereof;
seven radial spokes, each radial spoke extending from the cylindrical body adjacent the central shaft hole in a substantially identical spoke direction, the seven radial spokes being spaced equidistantly about a periphery of the central shaft hole, wherein each radial spoke extends at a first angle in a vertical plane of the rotor hub such that a line defined by each radial spoke does not intersect the axis of rotation, and each radial spoke extends at a second angle in a horizontal plane, perpendicular to the vertical plane of the rotor hub, the second angle being arranged in a direction opposite the direction of rotation of the rotor hub about the axis of rotation; and
seven substantially identical arcuate segments, each arcuate segment being mounted to a distal end of two adjacent radial spokes to define a hub aperture there between and including an opening into which a corresponding yoke is insertable to connect the hub to the blade, each arcuate segment being generally curved such that a radius of the rotor hub is non-uniform about a circumference thereof.

12. The rotor hub according to claim 11, wherein a thickness of each of the seven radial spokes is non-uniform over a length of the radial spoke.

13. The rotor hub according to claim 11, wherein a hollow inlet is formed in a surface of each of the seven radial spokes.

14. A rotor blade assembly comprising the rotor hub according to claim 1, further comprising rotor blades, and yokes which connect the rotor hub and the rotor blades.

15. A rotary wing aircraft comprising the rotor blade assembly of claim 14, and further comprising an airframe, and an engine disposed in the airframe which rotates the rotor blade assembly to generate lift.

* * * * *